United States Patent [19]
Gosdin

[11] Patent Number: 5,762,861
[45] Date of Patent: Jun. 9, 1998

[54] METHOD AND APPARATUS FOR PRODUCING HOLLOW PLASTIC OBJECTS WITH PRESSURIZED GAS INJECTION AFTER OVERFLOW CUT-OFF

[75] Inventor: Michael Gosdin, Meinerzhagen, Germany

[73] Assignee: Battenfeld GmbH, Meinerzhagen, Germany

[21] Appl. No.: 744,877

[22] Filed: Nov. 8, 1996

[30] Foreign Application Priority Data

Nov. 25, 1995 [DE] Germany ............... 195 43 944.9

[51] Int. Cl.$^6$ ............... B29C 45/17; B29C 45/73
[52] U.S. Cl. ............... 264/572; 425/130
[58] Field of Search ............... 264/572; 425/130

[56] References Cited

U.S. PATENT DOCUMENTS

| | | |
|---|---|---|
| 5,098,637 | 3/1992 | Hendry ............... 264/572 |
| 5,423,667 | 6/1995 | Jaroschek ............... 264/572 |
| 5,612,067 | 3/1997 | Kurihara et al. ............... 264/572 |

FOREIGN PATENT DOCUMENTS

| | | |
|---|---|---|
| 0 438 279 A1 | 7/1991 | European Pat. Off. . |
| 0 321 117 B1 | 12/1993 | European Pat. Off. . |
| 39 13 109 C2 | 10/1990 | Germany . |
| 39 13 109 A1 | 11/1990 | Germany . |
| 42 35 673 A1 | 4/1993 | Germany . |
| 43 00 397 A1 | 7/1993 | Germany . |
| 44 21 090 C1 | 12/1995 | Germany . |

*Primary Examiner*—Catherine Timm
*Attorney, Agent, or Firm*—Hamilton, Brook, Smith & Reynolds, P.C.

[57] ABSTRACT

A method and an apparatus for producing plastic objects with hollow spaces is disclosed. The method comprises the following steps: establishing a fluid connection (9) between the main cavity (2) of a mold (1) and an overflow cavity (8) and injecting a sufficient amount of plastic melt into the cavity (2) of the mold (1) along a melt flow path, which extends from a plasticizing unit (4, 5) through a plastic injection nozzle (3) into the mold (1), such that plastic melt passes from the main cavity (2) into the overflow cavity (8). The fluidic connection (9) between the main cavity (2) and the overflow cavity (8) is then broken-off prior to the introduction of a pressurized fluid, especially a pressurized gas, into the melt in the cavity (2) by means of at least one fluid injection nozzle (7), so that the melt situated in the cavity (2) is distributed in the cavity (2) while forming a hollow space, and is pressed against the cavity walls of the mold (1). The thus formed molded part is then allowed to cool down to a temperature below the melting point of the plastic melt, the cavity pressure is relieved, and the molded part is removed from the mold. The method advantageously achieves the result that the produced molded parts do not have any gas exit openings and the waste in the overflow main cavity (8) remains minimal.

8 Claims, 2 Drawing Sheets

METHOD AND APPARATUS FOR PRODUCING HOLLOW PLASTIC OBJECTS WITH PRESSURIZED GAS INJECTION AFTER OVERFLOW CUT-OFF

BACKGROUND OF THE INVENTION

U.S. Pat. No. 5,098,637 to Hendry discloses an internal gas pressure method that is used to produce hollow plastic molded parts. According to this prior art technique, a pressurized gas is injected into the plastic melt within the main molding tool cavity in order to form a hollow space in the interior of the molded parts. An overflow cavity is connected to the main cavity of the tool to receive any excess plastic displaced by the gas. The following process sequence is specified: plastic melt injection into the tool cavity; expelling a portion of the melt from the main cavity into the overflow cavity, by the introduction of the pressurized gas into the cavity;

cooling the melt; venting the cavity; and the removal of the finished molded part from the molding tool.

European Pat. Document EP 0 321 117 B1 to Melea Limited proposes a similar method. Plastic melt is first placed into the cavity of the molding tool. Then pressurized gas is injected into the melt, which distributes the melt over the interior surfaces of the molding tool and forms the hollow space within the melt.

Then follow the steps of cooling, venting, and removal from the mold. A portion of the melt is expelled from the main cavity into an overflow cavity while the melt or gas is being introduced into the main cavity, such that the overflow cavity first receives the gas, from which the gas then spreads into the main cavity.

A commonality between the two methods is that the main cavity and the overflow cavity are connected by a channel. This channel establishes a permanent fluidic connection between the two cavities.

The technology is developed further in German Pat. Document DE 39 13 109 C2 to Klochner Ferromatik. Here, the main cavity and the secondary cavity are connected through a channel which contains a valve, which makes it possible to disable or enable the connection between the main and secondary cavities. The corresponding method runs as follows. First, plastic melt is introduced into the mold cavity. The cavity is filled completely with the melt.

After the plastic melt has begun to solidify at the walls of the cavity, the core of the plastic body, which is still liquid, is expelled by a pressurized gas into the overflow cavity.

A similar method is known from the European Pat. Document EP 0 438 279 A1 to Keter Plastic. The objective there is to perform the actual injection molding process under the high pressure that is typical for injection molding, and not under the comparatively low gas pressure that normally prevails with the interior gas pressure techniques. A seal is here provided at the end of the cavity, and this seal is initially closed. In this operating mode, the melt is injected into the cavity at high pressure, until the cavity is completely filled. After the melt begins to solidify, the seal is opened, and thus a connection to an overflow cavity is enabled. The liquid, melted core of the molded part is then expelled into this overflow cavity by pressurized gas.

SUMMARY OF THE INVENTION

The previously-described methods have a number of disadvantages. The U.S. Pat. No. 5,098,637 and EP 0 321 117 B1 specify that the melt is expelled from the main cavity into the overflow cavity by injecting pressurized gas into the main cavity or into the interior of the melt situated in the main cavity. This requires expensive control systems for the gas flow and/or pressure in order to prevent that gas from also being driven from the main cavity into the secondary-cavity, i.e., breaks-through. If this happens, the finished molded part will have an undesirable opening, i.e., gas channel, which must then be closed in a further step, further increasing cost by slowing production.

The methods described in the DE 39 13 109 C2 and the EP 0 438 279 A1 require that the cavity be completely filled with melt and, before melt is expelled into the overflow cavity, that the melt be allowed to partially solidify, which requires an undesirable waiting time.

The invention concerns an improved method and an associated apparatus in which undesirable openings at the surface of the molded part can be reliably prevented. Furthermore, the invention achieves this advantage in the context of a faster production process that eliminates waiting times after introduction of the melt and before injection of the pressurized gas.

In general, according to one aspect, the invention features a plastic production process in which a fluid connection is established between the main cavity of a mold and an overflow cavity.

A plastic melt is then injected into the cavity of the mold along a melt flow path that extends from a plasticizing unit through a plastic injection nozzle into the mold. A sufficient amount of plastic is used such that plastic melt passes from the main cavity into the overflow cavity.

The fluidic connection between the main cavity and the overflow cavity is then broken off.

A pressurized fluid, especially a pressurized gas is introduced, into the melt in the cavity by means of at least one fluid injection nozzle, so that the melt that is situated in the cavity is distributed in the cavity while also forming a hollow space, and is pressed against the cavity walls of the mold.

The molded part is then allowed to cool down to a temperature below the melting point of the plastic melt, and the pressure of the pressurized fluid within the cavity is relieved; and the molded part removed from the mold.

In contrast to known methods, in which the melt is always expelled from the main cavity into the overflow cavity by introducing compressed fluid, the invention pursues the path that the transfer of melt from the main cavity into the secondary cavity is initiated exclusively by introducing the plastic melt into the main cavity and not by injecting pressurized gas. In the invention, the pressurized gas is introduced immediately after the fluidic connection between the main cavity and the secondary cavity has been shut off, so that no waiting time is needed before injecting the gas. Nevertheless, the melt still reaches all points of the mold, including in particular all the corners that are far removed from the point where the melt is injected into the cavity.

The valve(s) is activated to establish and break-off the fluidic connection between the main cavity and the overflow cavity. Alternatively, the connection can be effectively broken by controlling or regulating the pressure relationships between the cavity and/or in the overflow cavity. In this case, no separate elements such as valves or slides, are necessary but the flow of melt from the main cavity into the secondary cavity is achieved solely by creating the appropriate pressure conditions.

A further modification of the invention advantageously provides that, when pressurized fluid is introduced into the main cavity, melt is forced back from the cavity through the runner region into the plasticizing unit.

In order to assure that any valve(s) functions when the melt is expelled from the main cavity into the secondary cavity, a further modification of the invention provides that the connection region between the main cavity and the overflow cavity is heated in order to maintain the fluid connection between the main cavity and the overflow cavity.

The pressurized gas can be introduced into the melt either directly into the interior of the molded part which is being produced i.e., in article, into the region of the plastic injection nozzle, or into the region of the runner, i.e., in runner.

The apparatus for implementing the method has the following elements: a mold comprising at least two halves, with a cavity; a plasticizing unit and a plastic injection nozzle; at least one fluid injection nozzle; and at least one overflow cavity, which has a fluidic connection to the main cavity.

The invention also provides for some way of breaking off the fluidic connection between the main cavity and the overflow cavity. Valves may be used or pressure control or regulation used to influence the relative pressure between the cavity and/or in the overflow cavity.

Finally, heater(s) can be provided to heat the connection region between the main cavity and the overflow cavity to maintain a fluidic connection between the main cavity and the overflow cavity when it is initially requested.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views.

The drawings are not necessarily to scale; emphasis has instead been placed upon illustrating the principles of the invention. Of the drawings.

DETAILED DESCRIPTION OF THE INVENTION

Figure 1:
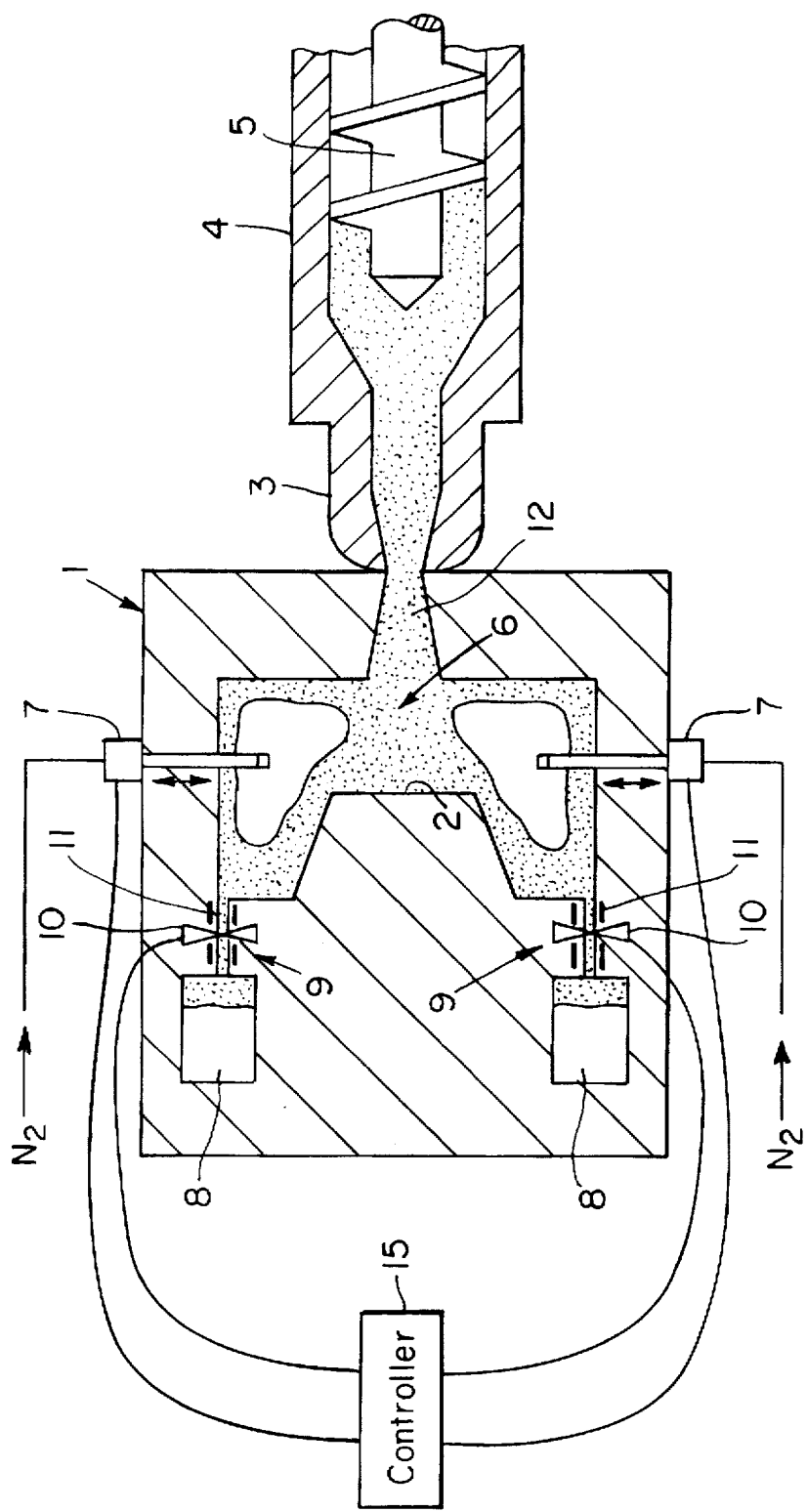
FIG. 1 schematically shows the inventive injection molding apparatus for producing hollow plastic objects according to the invention.

FIG. 1 shows an injection molding apparatus that has been constructed according to the principles of the invention. A mold 1, including at least two parts, has a cavity 2 or hollow space that defines the outer surface of a molded part 6 that is being produced. A plasticizing unit 4, 5 is connected to the mold. It has an extruder barrel 4 and a screw 5, which can execute both rotational and axial motion in the barrel. The connection between the mold 1 and the plasticizing unit 4, 5 is established by a plastic injection nozzle 3.

Two fluid injection nozzles 7 are translated along their axes by actuators so that the nozzles can be moved into and out of the cavity 2 by a controller 15 as illustrated by the arrows. They are shown positioned in the cavity. The pressurized fluid, specifically pressurized nitrogen from a source or supply unit (not shown), is introduced into the cavity through the nozzles also under control of the controller 15. The pressurized gas distributes the melt into the cavity 2 and presses it against the walls of the cavity 2. The fluid injection nozzles 7 can be attached at arbitrary points of the mold. For example, only one nozzle 7 can be used which is disposed concentric with the plastic injection nozzle 3. In this way, melt and fluid are introduced through the same mold opening.

In place of fluid injection nozzles which extend directly into the cavity, other known gasification elements can alternatively or additionally be used such as fluid nozzles that are integrated into the plastic injection nozzle 3 or into the runner. It may also be desirable to use only one fluid injection nozzle 7 in some cases.

In the present case, two overflow cavities 8 are connected to the main cavity 2. These receive the plastic melt via respective a fluidic channels 9 which extend between the main cavity 2 and the overflow cavities 8. Each channel 9 is equipped with heaters 11, which prevent the melt from cooling in the connection channels, so that it does not freeze and plug-up the connection channel. The heaters 11 thus assure a constant fluidic coupling between the main cavity and the secondary cavities, if this is desired in connection with this method. Valves 10 are usually used in the channels 9 to regulate the flow of plastic.

Alternatively, the connection channel 9 also can be designed to be very short, so that it actually is omitted; the main cavity 2 and the overflow cavity 8 are then connected directly to each other. In this configuration, valve 10 is always disposed in the connection channel 11 to block for the flow of melt from the main cavity 2 into the overflow cavity 8.

Figure 2:
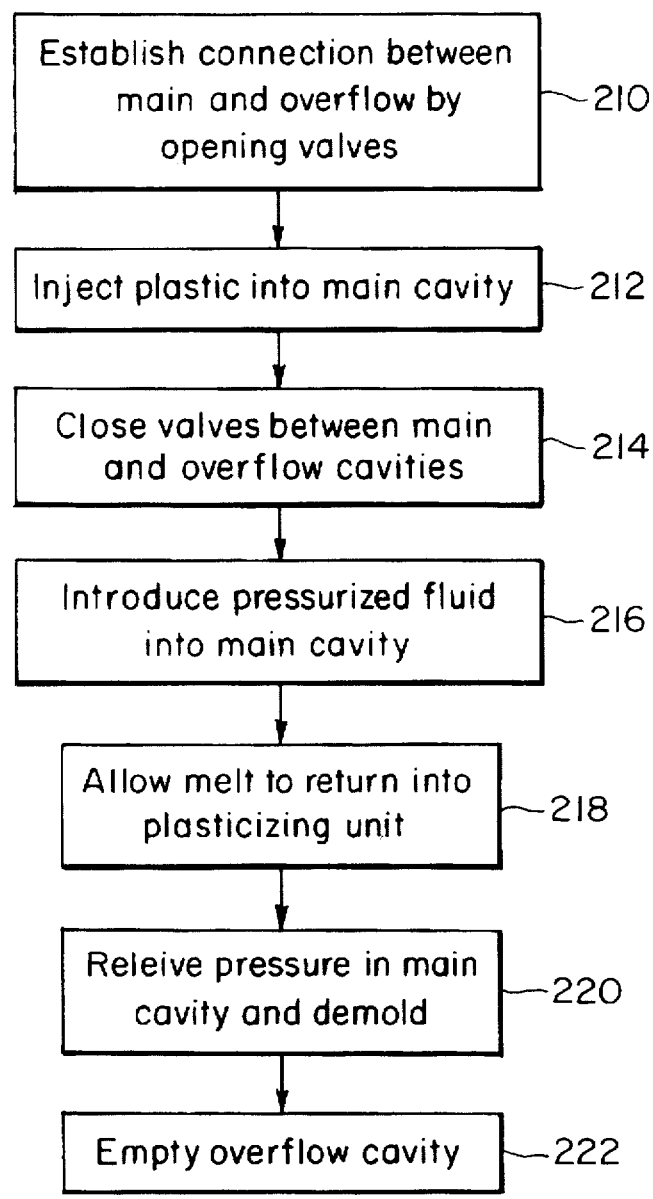
FIG. 2 is a process diagram illustrating the inventive method.

FIG. 2 shows the process for producing a molded part 6.

First in step 210, the connection channel 9 between the main cavity 2 and the overflow cavities 8 is released by opening the valves 10, so that melt can flow over from the main cavity 2 into the secondary cavities 8 by the controller 15. A fluidic connection between the main cavity 2 and the overflow cavities 8 is thus established.

Then in step 212, the plastic melt is injected into the cavity 2 through the plastic injection nozzle 3, in an amount that is sufficient to produce the desired molded part 6. Since the connection channels 9 are open, the melt passes from the main cavity 2 into the overflow cavities 8. It is desirable to locate the overflow cavities as shown so that even the remotest point of the cavity from the perspective of the plastic injection nozzle 3 is also reached by the melt. As a result, all the 'corners' of the cavity 2 are filled with melt.

When sufficient melt has been injected into the cavity, the valves 10 are then closed to block the connection channels 9 between the main cavity and the secondary cavities so that no more melt can flow over in step 214.

Only after the valves are closed is pressurized fluid introduced in step 216 by means of the fluid injection nozzles 7, which have been located in the interior of the melt in the cavity 2 by actuators. FIG. 1 shows this state of the process. The introduction of pressurized fluid results in the formation of hollow spaces in the interior of the melt. These hollow spaces are beneficial, on the one hand, because of weight savings in the molded part 6 compared to a solid part. Furthermore, sink marks on the surface of the molded part 6 that originate from the volume contraction of the melt during the cooling process are also prevented.

If larger hollow spaces are desired in the interior of the molded part 6 that are greater than the volume contraction due to cooling, it can be advantageously arranged that melt is pressed through the runner region 12 back into the plasticizing unit 4, 5 in step 218. The screw 5 can here be withdrawn - with force pre-tension—by an amount that corresponds to the melt volume that is to be returned. In contrast to the connections between the main cavity 2 and the overflow cavities 8, no valves 10 are provided between the cavity 2 and the runner region 12 or the screw antechamber.

In the prior art, melt is expelled into the overflow cavity generally by introducing gas (which disadvantageously increases the waste volume in the overflow cavities). By contrast, the inventive method makes it possible to return this volume of melt, at least partly, directly to the plasticizing unit. As a result, this waste is not created. Rather, this volume will be processed immediately at the next shot for the following molded part.

When the melt, which forms the molded part 6 has cooled sufficiently, it can be removed from the mold 1.

However, before the two halves of the mold are opened, the fluid pressure in the molded part must first be dissipated in step 220. For this purpose, the gas flow path is enabled, e.g., by means of suitable valves, which are not shown here.

Before the next injection molding cycle, the overflow cavity 8 must also be emptied in step 222. Its solidified contents can be sent for recycling.

While this invention has been particularly shown and described with references to preferred embodiments thereof, it will be understood by those skilled in the art that various changes in form and detail may be made therein without departing from the spirit and scope of the invention as defined by the appended claims.

I claim:

1. A method for producing plastic parts with hollow spaces, comprising:

establishing a fluid connection between a main cavity of a mold and an overflow cavity;

injecting a sufficient amount of plastic melt into the main cavity of the mold along a melt flow path, which extends from a plasticizing unit through a plastic injection nozzle into the mold, such that plastic melt passes from the main cavity into the overflow cavity;

breaking off the fluid connection between the main cavity and the overflow cavity;

after the fluid connection between the main cavity and overflow cavity has been broken off, introducing a pressurized fluid into the melt in the main cavity via at least one fluid injection nozzle to distribute the plastic melt situated in the main cavity while forming a hollow space;

allowing the produced molded part to cool down to a temperature below the melting point of the plastic;

relieving the cavity of the pressure of the pressurized fluid; and removing the molded part from the mold.

2. The method of claim 1, further comprising activating at least one valve to establish and break off the fluid connection between the main cavity and the overflow cavity.

3. The method of claim 1, further comprising regulating pressure conditions in the main cavity and/or in the overflow cavity to establish and break off the fluid connection between the main cavity and the overflow cavity.

4. The method of claim 1, further comprising forcing melt back from the main cavity through a runner region into the plasticizing unit by introducing the pressurized fluid.

5. A method for producing plastic parts with hollow spaces, comprising:

establishing a fluid connection between a main cavity of a mold and an overflow cavity;

injecting a sufficient amount of plastic melt into the main cavity of the mold along a melt flow path, which extends from a plasticizing unit through a plastic injection nozzle into the mold, such that plastic melt passes from the main cavity into the overflow cavity;

heating a connection region between the main cavity and the overflow cavity to maintain the fluid connection between the main cavity and the overflow cavity;

breaking off the fluid connection between the main cavity and the overflow cavity;

introducing a pressurized fluid into the melt in the main cavity via at least one fluid injection nozzle to distribute the plastic melt situated in the main cavity while forming a hollow space;

allowing the produced molded part to cool down to a temperature below the melting point of the plastic;

relieving the cavity of the pressure of the pressurized fluid; and removing the molded part from the mold.

6. The method of claim 1, further comprising introducing the pressurized fluid directly into the interior of the molded part that is being produced.

7. The method of claim 1, further comprising introducing the pressurized fluid in the area of the plastic injection nozzle or in the area of a runner.

8. The method of claim 1, further comprising establishing the fluid connection between the main cavity and the overflow cavity prior to injecting the plastic melt into the main cavity.

* * * * *